3,846,290
RECLAMATION OF HYDROCARBON CONTAMINATED GROUND WATERS

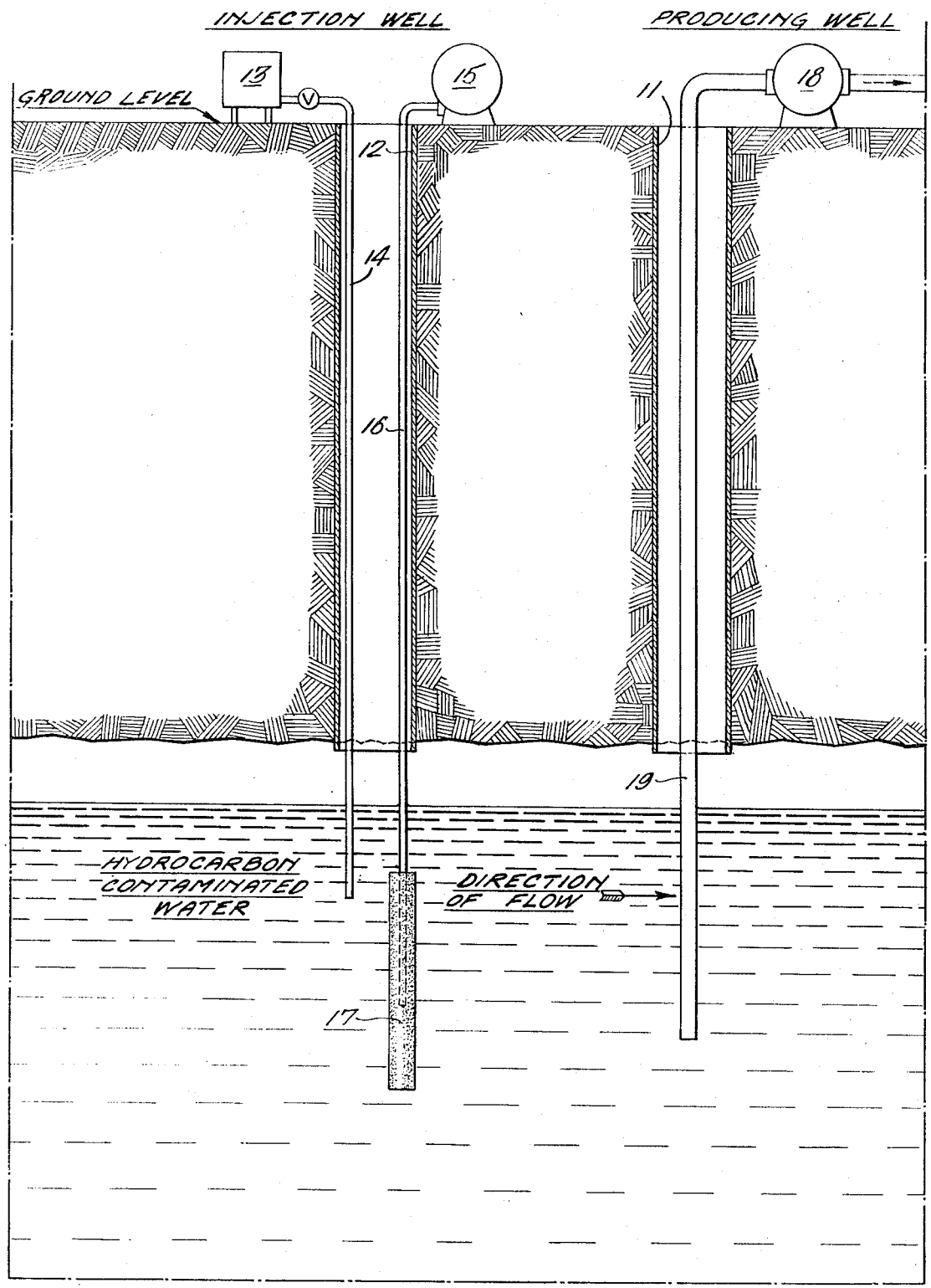

Richard L. Raymond, Wilmington, Del., assignor to Sun Research and Development Co., Philadelphia, Pa.
Filed Sept. 29, 1972, Ser. No. 293,621
Int. Cl. C02c 5/10
U.S. Cl. 210—11     7 Claims

ABSTRACT OF THE DISCLOSURE

A process for eliminating hydrocarbon contaminants from underground water sources by providing nutrients and oxygen for hydrocarbon-consuming microorganism normally present in said underground waters, said nutrients and oxygen being introduced through wells within or adjacent said contaminated area, and removing water from said contaminated area until hydrocarbons are reduced to an acceptable level.

---

Contamination of ground water by petroleum products such as crude oil and gasoline has been reported on several occasions, such case histories being discussed by McKee et al. in Journal of the Water Pollution Control Federation, Vol. 44, No. 2, February 1972, pp. 293–302. The amount of gasoline contamination in water need not be great to be detected by taste, as little as 0.005 mg./l. being detected by sensitive people. Since the solubility of modern gasolines in water is about 20 to about 80 mg./l., as little as one-hundreth the average solubility of gasoline in water will cause a taste or odor problem. In the above article it is pointed out that species of Pseudomonas and Arthrobacter which are ubiquitous in natural soils should biodegrade pellicular gasoline (i.e., gasoline which has formed a thin skin held by molecular attraction to soil grains), and that such degradation would require a few years to degrade all of the gasoline. It has also been reported that petroleum products in soil can be demonstrated for at least two years and up to 70 years. It is thus clear that biodegradation occuring from natural causes cannot be depended upon the remove petroleum contamination in a reasonable time.

One of the reasons that hydrocarbon biodegradation under natural conditions in ground waters is not very efficient is the rather low temperature found in ground water. Biodegradation of hydrocarbons in soil is optimum at about 25° to about 35° C., but subsurface ground waters have a temperature of from about 10° to about 15° C. Thus, it would appear unlikely that biodegradation activity can be significantly accelerated under such temperature conditions.

However, in accord with this invention, it has been found that hydrocarbon contaminants of underground water sources can be quickly disposed by providing nutrients and oxygen for hydrocarbon-consuming microorganisms normally present in said underground waters, said nutrients and oxygen being introduced through wells within or adjacent to said contaminated area and removing water from said contaminated area until the contaminating hydrocarbons are no longer present or are reduced to an acceptable level.

The process of the invention will be further understood by reference to the drawing. As shown there, a contaminated producing well 11 will yield hydrocarbon contaminated water due to the presence of hydrocarbons (such as crude oil, fuel oil, gasoline, or other hydrocarbon) in the water. A second well 12 which, if necessary, may be specifically drilled for this purpose, is within the contaminated area and adjacent the producing well 11 and will be employed as an injection well. At ground level, the injection well will be equipped with a mixing tank 13 for the nutrients and an injection tube 14 extending from the tank to the water level for introducing the nutrients to the subsurface water. An air pump 15 pumps air through a conduit 16 to below the water level, the conduit being preferably fitted with a sparger device 17 to effect smooth and uniform distribution of the air throughout the water area. A pump 18 at the producing well 11 removes water from the well through a submerged conduit 19 thus causing a flow of subsurface water from the injection well area to the producing well area. The normal microorganism flora between the injection well and the producing well will thus have sufficient nutrients and oxygen to effectively feed on the hydrocarbon substrate present in the area between the wells and decomposition of the unwanted hydrocarbon will proceed in good order.

The distance between the injection well and the producing well will depend upon the area of contamination and the porosity of the formation. The injection well will preferably be on the outside perimeter of the contaminated area so that nutrients move through all of the contaminated area to the producing well. It will be understood that the injection well need not necessarily be within the contaminated area, but may be outside it and merely in the vicinity of the area. The water flow created by the output of the producing well will bring the nutrients and oxygen into the contaminated area where the biodegradation of hydrocarbon will occur. Where the formation involved is dense, the distance between the two wells may be closer than where a porous formation is involved. In a typically porous formation, a single producing well will effect significant water movement for a radius of greater than 600 feet. On the other hand, if the producing well and injection well are too close, significant losses of nutrient may occur due to its being pumped out of the producing well. To avoid such nutrient losses, a minimum distance between the two wells of about 100 feet should be maintained. The pumping rate should also be carefully balanced with the regeneration of the water table. If the pumping rate is too high, there is the possibility of having the hydrocarbon trapped in the formation out of contact with nutrients.

The nutrients fed to the microbial flora will be in the form of an aqueous solution of appropriate nitrogen, phosphorous, and, optionally, other inorganic salt materials. Preferably, nitrogen will be supplied as $NH_4NO_3$, $NaNO_3$ or as $(NH_4)_2SO_4$, although urea, urea-formaldehyde, ammonia gas, etc., may also be used. Phosphorus is readily provided as $KH_2PO_4$, $Na_2HPO_4$, $K_2HPO_4$ and the like. Diammonium acid phosphate [$(NH_4)_2HPO_4$] is useful for supplying both nitrogen and phosphorus, but is not too satisfactory for some groundwaters as it causes flocculation of minerals which may result in nutritional deficiencies for the hydrocarbon-oxidizing flora. Liquid fertilizers such as 12–6–6 and 8–8–8 are other useful nutrients for the process.

The concentration of the nutrients may be quite low and still provide for adequate growth of the microorganisms. In general, a concentration of about 0.005 to 0.02 percent by weight of the formation water for each of the nutrients (nitrogen, potassium and phosphorus) will be used. A typical nutrient composition may comprise 0.05% $(NH_4)_2SO_4$ and 0.05% of a mixture of phosphate salts (e.g., 3 parts $Na_2HPO_4$ and 2 parts $KH_2PO_4$). Since it is often very difficult or impossible to estimate the amount of water in the contaminated area, a means of controlling the desired nutrient concentration is to gradually add nutrients through the injector well and measure the concentration of the output at the producing well. In this way nutrient additions may be made until the desired concentration is obtained at the producing well. The pH of the nutrient solution that is fed to the well should be essentially neutral, that is, from about 6.5 to about 7.5.

The oxygen supplied to the well is preferably supplied in the form of air and the rate at which it is pumped into the well will be such as to provide an oxygen level in the water at the producing well of greater than 0.1 p.p.m. The upper limit of oxygen in the water will, of course, be determined by its solubility, which at 11–12° C. is about 11 p.p.m. To remove 1.25 tons of hydrocarbon (in the form of gasoline) per day, about 5 tons of air per day will be required. Thus, for example, using a porous aloxite stone of about 4″ x 24″ in size as a sparger, air will be pumped into an injection well at a rate of about 2.5 cubic feet per minute initially and this rate will then be adjusted depending upon the values for dissolved oxygen found in the water from the producer well.

The drawing discussed above shows an injection well adjacent the producing well and it will be understood that more than one injection well for each producing well may be used. It is also desirable, and frequently preferred, to carry out the process by employing a number of injection wells, many of them being on the periphery of the contaminated area. One or more producing wells can, of course, be used within the peripheral area.

In spite of the low temperature (on the order of 10° to 15° C.) the hydrocarbon degradation due to the microorganisms will occur rather rapidly under the condition of the process. If the growth rate of the organism is 0.02 grams per liter per day, it is expected that about 90 percent hydrocarbon degradation should occur in not more than about six months. It will be understood, of course, that numerous factors will contribute to the actual time for complete degradation to occur (e.g., the volume of contaminated area, area porosity, etc.), but the above is a guide as to the efficiency of the process.

After the hydrocarbon contamination is eliminated or effectively reduced by the microbial action, the flow of nutrients is stopped and this, in turn, will allow the microbial concentration to return to normal conditions. No bacterial or other microorganisms need be added to the water system in order for the process of this invention to be effective and this is a particular advantage since the normal flora may be maintained without any undesirable ecological effects from added organisms.

It will be understood that when an underground source of water is contaminated with hydrocarbon a non-homogeneous system results. For example, with gasoline contamination, some of the gasoline will be dissolved in the water, some will gather in pockets and crevices of rock and earth, some will float on the water surface, and some will cling to rocks and earth as droplets. For this reason it is difficult to determine the actual concentration of the contaminant in the water supply. However, the process of this invention will be useful with high levels of contamination and will preferably be used with gasoline contaminated systems. In the case of gasoline contamination, the process will be most efficient with systems containing below about 40 p.p.m. of gasoline per part of water in the contaminated area. This limitation is due to the fact that at this level certain components of the gasoline (e.g., toluene) may cause lysis of the microbial cells and thus reduce the effectiveness of the biodegradation process.

In order to further illustrate the invention the following example is given:

EXAMPLE

An essentially circular area of land (average radius of about 350 feet) having a number of water wells throughout (about 20 million gallons of water) is contaminated with about 54,500 gallons (344,000 lbs.) of high octane gasoline from a broken pipe line which carries gasoline through the area to a remote point. Ten wells on the periphery of the contaminated area are prepared as injection wells by erecting a mixture tank at each well and providing an injection tube and an air pump, conduit and sparger. Two wells in the central portion of the contaminated area are selected as producing wells.

A solution of 80 parts by weight of $(NH_4)_2SO_4$, 48 parts of $Na_2HPO_4$ and 32 parts of $KH_2PO_4$ in 834 parts of water is injected into each injection well at a rate of 5 gallons per hour. Air is simultaneously pumped into each injection well through a porous sparger at a rate of 3.5 cu. ft./min. in order to introduce oxygen into the formation water.

The pumps of the two producing wells remove from the formation a total of about 1.5 million gallons of water per day. In this way water movement from the injection wells to the producing wells is achieved and the approximately 1.25 tons of bacterial cells produced each day effectively remove the gasoline from the water and surrounding formation in about 100 days.

The invention claimed is:

1. A process for purifying an underground water supply containing hydrocarbon contaminants by biodegrading said hydrocarbon contaminants in said underground water supply without the addition of microorganisms which comprises providing oxygen and nutrients comprised of nitrogen, phosphorus and potassium for hydrocarbon-consuming microorganisms normally present in said underground waters, said nutrients and oxygen being introduced through wells in the area of said contaminated supply, and removing water from a well located within said contaminated area until hydrocarbons are reduced to an acceptable level.

2. The process of Claim 1 where each nutrient in the underground water supply is maintained at a concentration of from about 0.005 to about 0.02 percent by weight of water.

3. A process for purifying an underground water supply containing a hydrocarbon contaminant by biodegrading said hydrocarbon contaminant in said underground water supply without the addition of microorganisms which comprises adding to said contaminated water, oxygen and nutrients comprised of nitrogen, phosphorus and potassium for hydrocarbon-consuming microorganisms normally present in said underground waters, said nutrients and oxygen being added by injection through wells peripheral to the area of said contaminated supply, and removing water from a well within said contaminated area until the contaminating hydrocarbon is reduced to an acceptable level.

4. The process of Claim 3 where the concentration of each nutrient in the underground water supply is maintained at a concentration of from about 0.005 to about 0.02 percent by weight of water.

5. The process of Claim 3 where the hydrocarbon contaminant is gasoline.

6. The process of Claim 4 where the hydrocarbon contaminant is gasoline.

7. A process for purifying an underground water supply containing gasoline contaminants by biodegrading said gasoline contaminants from said underground water supply without the addition of microorganisms, said contamination being below about 40 p.p.m. of gasoline per part of water in the contaminated area, which comprises adding to said contaminated water, oxygen and nutrients comprised of nitrogen, phosphorus and potassium for hydrocarbon-consuming microorganisms normally present in said underground waters, said nutrients and oxygen being added by injection through wells peripheral to the area of said contaminated supply to obtain a nutrient concentration of from about 0.005 to about 0.02 percent by weight of water, and removing water from a well within said contaminated area until the gasoline contaminants are no longer present or are reduced to an acceptable level.

References Cited

UNITED STATES PATENTS

| | | | |
|---|---|---|---|
| 3,332,487 | 7/1967 | Jones | 166—246 |
| 3,105,014 | 9/1963 | Harrison | 166—246 X |
| 3,185,216 | 5/1965 | Hitzman | 166—246 |
| 3,152,983 | 10/1964 | Davis et al. | 210—11 |
| 2,413,278 | 12/1946 | Zobell | 195—34 |
| 3,769,164 | 10/1973 | Azaronicz | 195—34 |

THOMAS G. WISE, Primary Examiner

U.S. Cl. X.R.

166—246